United States Patent [19]
Labeda

[11] 3,860,293
[45] Jan. 14, 1975

[54] SKATE WHEEL

[76] Inventor: Robert J. Labeda, 6040 Indiana, Buena Park, Calif. 90621

[22] Filed: Sept. 17, 1973

[21] Appl. No.: 398,300

[52] U.S. Cl. .................................. 301/5.7, 308/190
[51] Int. Cl. ........................................... A63c 17/22
[58] Field of Search ............... 301/5.7, 5.3, 63 PW; 308/190, 191; 29/159 R, 159.3

[56] References Cited
UNITED STATES PATENTS

| | | | |
|---|---|---|---|
| 1,006,952 | 10/1911 | King | 301/5.3 |
| 2,262,714 | 11/1941 | Ware | 301/5.3 |
| 2,476,193 | 7/1949 | Hirschmugl | 308/190 |
| 2,519,927 | 8/1950 | Pedu | 301/5.7 |
| 2,612,410 | 9/1952 | Deschenes | 301/5.7 |
| 2,622,931 | 12/1952 | Petrelli | 301/5.7 |
| 2,730,222 | 1/1956 | Klein | 301/63 PW |

Primary Examiner—M. Henson Wood, Jr.
Assistant Examiner—Reinhard J. Eisenzopf
Attorney, Agent, or Firm—Dominick Nardelli

[57] ABSTRACT

A skate wheel is disclosed having a rim or tire made of wood and a metallic hub wherein the outer races of suitable ball bearings are mounted. The metallic hub has a cylindrical outer surface with axially aligned grooves and edges formed at one end and circumferential grooves axially spaced and an external taper at the other end. Epoxy glue is applied onto the hub and into the bore of the tire and the hub is press fitted into the wooden tire. After the glue is set, the wheel assembly can be placed within a lathe and the wheel made almost perfectly round and balanced.

6 Claims, 3 Drawing Figures

PATENTED JAN 14 1975  3,860,293

3,860,293

SKATE WHEEL

FIELD OF THE INVENTION

This invention relates to a skate wheel and, more particularly, to an economical improved balanced skate wheel.

BACKGROUND OF THE INVENTION

Skate wheels are preferably made of hard wood and a hub is provided wherein ball bearings can be installed. Skate wheels, up to now, have been made by first forming the annular wooden tire and then assembling therein the outer bearing races or the complete bearing (the roller assembly with the outer and inner races). One finds that after the bearings are in place, the assembled wheel is not as well balanced as one would like it to be. As one skilled in the art knows, the longevity and usefulness of a skate wheel is directly related to its degree of balance.

OBJECTS OF THE INVENTION

An object of this invention is to provide an improved balanced skate wheel.

Another object of this invention is to include coaxial within a wooden tire a means that provides mounting for the bearings and allows the wheel to be turned down within a lathe after the means is fixed to the wooden tire.

These and other objects and features of advantages of this invention will become more apparent after studying the following detailed description of the preferred embodiment of my invention together with the appended drawings.

DETAILED DESCRIPTION OF THE DRAWINGS

Figure 2:
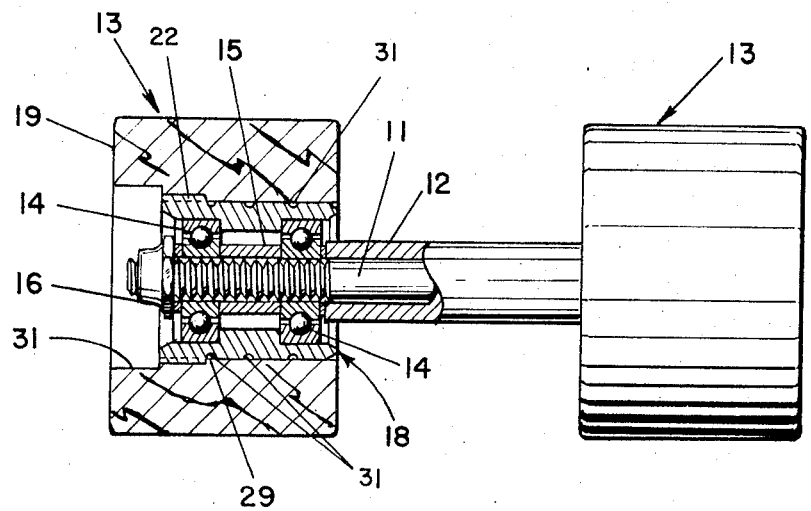
FIG. 2 is an elevation, partial section, showing one axle assembly employing my novel skate wheel.

An axle skate wheel assembly is shown in FIG. 2 and includes a standard axle 11 that slides through a skate truck 12 schematically shown. On each end of the axle 11 are mounted wheels 13. Although one of the wheels is shown in section, to show the details thereof, the other wheel is constructed in a similar manner. Each wheel has two standard bearings 14, each having an outer and inner races with balls therebetween. A spacer sleeve 15 is disposed between the bearings in a standard manner while a nut 16 keeps the axle assembly intact.

Figure 1:
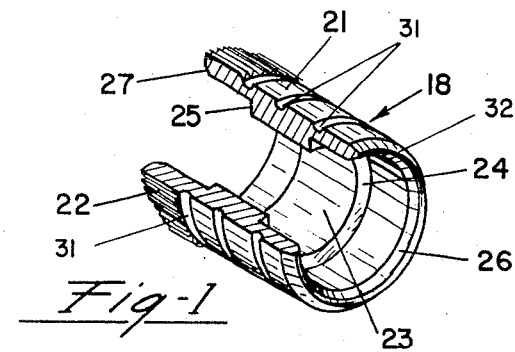
FIG. 1 is a pictorial view with portions cut away of the preferred embodiment of the hub for my novel wheel.
Figure 3:
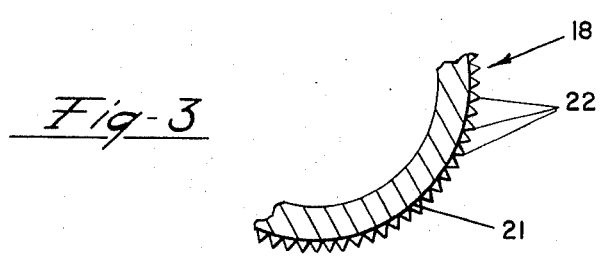
FIG. 3 is a sectional of a part of the hub of FIG. 1 taken near one edge thereof.

On the outer races of the bearing 14 is mounted my novel wheel 13. The wheel 13 has a hub 18 fixed to a wooden tire 19. The hub 18 has a cylindrical outer surface 21 more clearly shown in FIG. 1. At one end of surface 21 is formed a rough portion 22 consisting, for example, of axially aligned ridges and grooves having a diameter greater than the hub 18, as shown in FIG. 3, for reasons that will be described hereinafter. The hub 18 has a bore 23 that has been counterbored from both ends to form square shoulders 24 and 25 disposed opposite each other about a transverse center plane. Against each of the shoulders 24 and 25 are placed the respective outer race of ball bearings 14, as shown in FIG. 2. This allows the bearings 14 to withstand thrust loads in a standard manner. At each end of the bore 23, conical surfaces 26 and 27 are formed for reasons that will be explained hereinafter. The wooden tire 19 has a cylindrical bore 29 substantially the same diameter as the cylindrical surface 21 on the hub 18 so that the hub fits snugly therein or preferably makes a slight press fit therebetween. For reasons well known, the outer bearing 14 is located nearer the center of the wheel than the inner bearing 14 and, therefore, in this embodiment, the tire 19 is axially wider than the hub 18. To facilitate mounting the hub 18 within the tire 19, the bore 29 in the tire 19 is counterbored at one end, as shown at 31. An epoxy glue is applied over the outside of the hub 18 and within the bore of the tire 19. Since the external diameter of the hub 18 is such that it must be press fitted into the tire 19, all the epoxy glue therebetween will be wiped away when the two are assembled. To insure proper bonding circumferential grooves 31, for example three, are formed on the hub 18 as shown and an external taper 32 is formed at the end opposite the rough portion 22. groove 31 could be helical. Therefore when the hub 18 is pressed into the tire, the epoxy glue is insured of being lodged within the grooves 31 to form a substantially good bond. The axially aligned ridges bite into the tire to ensure no circumferential slippage.

With the hub 18 secured to the tire 19, the assembled item can be placed within a lathe and turned true. The conical surfaces 26 and 27 allow the center points (not shown) on the lathe to hold the item steady on the axis of rotation. The item is rotated and a tool is used to make the external surface on the tire cylindrical and coaxial with the axis of rotation. Since the hub 18 has also been made by turning it in a lathe, the hub 18 is cylindrical and almost perfectly balanced. The two, when combined, form an almost balanced wheel wherein the wheel can last at high speeds for a relatively long time.

Having described the preferred embodiment of my invention, one skilled in the art, after studying the above disclosure can devise other embodiments without departing from the spirit or scope of my invention. Therefore, my invention is not to be considered limited to the described embodiment but includes all embodiments falling within the scope of the claims.

I claim:

1. An assembly comprising:

a metallic hub, and a nonmetallic tire surrounding said hub and fixed thereto;

said hub having a cylindrical outer surface and a circular bore;

said tire having a cylindrical outer surface and a cylindrical bore coaxially disposed;

the shape of said bore in said hub being such that oppositely disposed shoulders are formed equally distant from the respective ends wherein the diameter of said bore is greater nearer the ends than at the center;

said hub having two internal conical surfaces formed one at each end of said bore of said hub and said internal conical surfaces being axially aligned to allow machining said tire in a lathe thereby making the tire cylindrical and coaxial with the axis of rotation.

2. The assembly of claim 1 wherein:
roller type bearings are disposed within said bore, one against each shoulder; and
an axle is disposed passing through each bearing.

3. The assembly of claim 2 wherein:
another metallic hub is disposed around said axle with another nonmetallic tire surrounding said other hub and fixed thereto;
said other hub having an axially symmetrical cylindrical outer surface and an axially symmetrical bore;
said other tire having a cylindrical outer surface and a cylindrical bore coaxially disposed;
said bore in said other hub being shaped to adopt thrust bearing loads; and
each of said hubs is disposed on a respective end of said axle.

4. An assembly comprising:
a metallic hub, and
a nonmetallic tire surrounding said hub and fixed thereto;
said hub having a cylindrical outer surface and an axially symmetrical bore;
said tire having a cylindrical outer surface and a cylindrical bore coaxially disposed;
said bore in said hub being shaped to adopt thrust bearing loads;
said hub having formed on its outer surface at least one circumferentially disposed groove; and
a bonding means disposed within the cavity formed by said groove and said tire.

5. The assembly of claim 4 wherein:
said outer surface of said hub has also a rough portion at one end for preventing axial rotation between said tire and said hub, and an external taper formed on the other end of said hub to allow easy insertion of said hub into said tire.

6. The assembly of claim 5 wherein:
said rough portion consists of axially aligned ridges extending above the outer surface of said hub.

* * * * *